(12) United States Patent
Choi et al.

(10) Patent No.: US 8,233,420 B2
(45) Date of Patent: Jul. 31, 2012

(54) METHOD FOR WIRELESS MULTI-HOP NETWORK USING SYNCHRONOUS MAC PROTOCOL

(75) Inventors: Bumgon Choi, Yongin-si (KR); Youngik Kim, Ansan-si (KR); Minyoung Chung, Mapo-gu (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 379 days.

(21) Appl. No.: 12/691,774

(22) Filed: Jan. 22, 2010

(65) Prior Publication Data
US 2011/0069656 A1    Mar. 24, 2011

(30) Foreign Application Priority Data
Sep. 23, 2009  (KR) .................. 10-2009-0090036

(51) Int. Cl.
*G08C 17/00*    (2006.01)
(52) U.S. Cl. ......... 370/311; 370/338; 370/350; 370/503
(58) Field of Classification Search .................. 370/311, 370/338, 350, 503
See application file for complete search history.

(56) References Cited

U.S. PATENT DOCUMENTS
2008/0070614 A1*  3/2008  Ogushi et al. ................. 455/522
2011/0176467 A1*  7/2011  Lampe et al. .................. 370/311
* cited by examiner

*Primary Examiner* — Steven H Nguyen
(74) *Attorney, Agent, or Firm* — Sherr & Vaughn, PLLC (57) ABSTRACT

Technology for a wireless multi-hop network is provided. A method by which a source node operates in a wireless multi-hop network includes selecting one of first to M-th frame structures (M is a natural number greater than or equal to 2), based on a data packet generation interval, when the source node is in an active state, synchronizing with neighboring nodes in a first synchronization period of the selected frame structure, and when the source node is in the active state, transmitting a control packet to a next hop in a data period of the selected frame structure, and waiting for a response from the next hop, the control packet indicating that the source node will transmit a data packet in a sleep period subsequent to the data period and including information on the selected frame structure. Here, each of the first to M-th frame structures defines a frame including at least one synchronization period, at least one data period, and at least one sleep period, and having a different duty cycle.

18 Claims, 9 Drawing Sheets

METHOD FOR WIRELESS MULTI-HOP NETWORK USING SYNCHRONOUS MAC PROTOCOL

CROSS-REFERENCE TO RELATED APPLICATION

This application claims priority to and the benefit of Korean Patent Application No. 2009-0090036, filed Sep. 23, 2009, the disclosure of which is incorporated herein by reference in its entirety.

TECHNICAL FIELD

The described technology relates generally to a wireless multi-hop network and, more particularly, but not exclusively, to a method for performing synchronous medium access control (MAC) to improve performance of a wireless sensor network.

BACKGROUND

In wireless multi-hop networks, such as wireless sensor networks and mobile ad-hoc networks, data transmitted from a source node may arrive at a destination node via a relay of intermediate nodes.

Such wireless multi-hop networks are designed in view of transmission performances such as end-to-end transmission latency, a transmission rate, and the like, as in other communication systems. The wireless multi-hop networks may be designed in view of energy efficiency when energy-limited nodes are included in the wireless multi-hop networks.

SUMMARY

A method by which a node operates in a wireless multi-hop network including a plurality of synchronized nodes is provided.

According to an aspect of the present disclosure, a method by which a source node operates in a wireless multi-hop network includes: selecting one of first to M-th frame structures (M is a natural number greater than or equal to 2), based on a data packet generation interval; when the source node is in an active state, synchronizing with neighboring nodes in a first synchronization period of the selected frame structure; and when the source node is in the active state, transmitting a control packet to a next hop in a data period of the selected frame structure, and waiting for a response from the next hop, the control packet indicating that the source node will transmit a data packet in a sleep period subsequent to the data period and including information on the selected frame structure. Here, each of the first to M-th frame structures defines a frame including at least one synchronization period, at least one data period, and at least one sleep period, and having a different duty cycle.

Each of the first to M-th frame structures may define a frame including a different number of sub-frames sequentially including a synchronization period, a data period, and a sleep period, and having a previously set time length $T_1$, and the synchronization period and the data period of each sub-frame may have a fixed time length irrespective of the frame structure. The frame defined according to the m-th frame structure (m is a natural number ranging from 1 to M) may include $2^{m-1}$ sub-frames having a time length of $T_m = T_1/2^{m-1}$. Selecting one of first to M-th frame structures may include: if the data packet generation interval $D_{int}$ is greater than or equal to $2 \cdot T_1$, selecting the first frame structure, and otherwise, selecting the m-th frame structure satisfying $T_{m-1} \leq D_{int} < 2 \cdot T_{m-1}$ (where m is a natural number greater than or equal to 2 and less than or equal to M).

The wireless multi-hop network may include a wireless sensor network.

According to another aspect of the present disclosure, a method by which a node having a data packet to transmit operates in a wireless multi-hop network includes: determining a current frame structure; and when the node is in an active state, transmitting a control packet to a next hop in a data period of the determined frame structure, and receiving a response from the next hop, the control packet indicating that the node will transmit the data packet in a sleep period subsequent to the data period and including information on the determined frame structure. Here, the determined frame structure is one of first to M-th frame structures (M is a natural number greater than or equal to 2), and each of the first to M-th frame structures defines a frame including at least one synchronization period for synchronizing with neighboring nodes, at least one data period, and at least one sleep period, and having a different duty cycle.

According to still another aspect of the present disclosure, a method by which a node operates in a wireless multi-hop network includes: when the node is in an active state, synchronizing with neighboring nodes in a synchronization period of a current frame structure, the current frame structure being any one of first to M-th frame structures (M is a natural number greater than or equal to 2); when the node is in the active state, receiving a control packet from any one of the neighboring nodes in a data period of the current frame structure, the control packet indicating that the node will transmit a data packet in a sleep period subsequent to the data period and including frame structure information; when a next hop address included in the received control packet is an address of the node itself, updating the current frame structure with a frame structure according to the frame structure information; and operating according to the updated frame structure. Here, each of the first to M-th frame structures defines a frame including at least one synchronization period for synchronizing with the neighboring nodes, at least one data period, and at least one sleep period, and having a different duty cycle.

BRIEF DESCRIPTION OF THE DRAWINGS

The above and other features and advantages of the present disclosure will become more apparent to those of ordinary skill in the art by describing in detail example embodiments thereof with reference to the attached drawings in which.

DETAILED DESCRIPTION

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms used therein including technical or scientific terms have meanings understood by those skilled in the art. Terms generally defined in dictionaries should be construed as having a meaning on a context of related schemes, and not as having an abnormally or inordinately formal meaning, unless clearly defined.

The described technology may be applied to an environment allowing nodes in a wireless multi-hop network to be synchronized to a specific cycle and operate. For convenience of illustration, the described technology will be described in connection with a wireless sensor network. However, it will be understood by those skilled in the art that applicability of the described technology is not necessarily limited to the wireless sensor network.

The wireless sensor network is a combination of an existing wired/wireless network infrastructure and a sensor device for context awareness to provide a variety of application services. The wireless sensor network is capable of local area wireless communication and consists of sensor nodes that can autonomously build a network. The wireless sensor network can be applied to a variety of fields, such as industrial, environmental, military, and healthcare.

Figure 1:
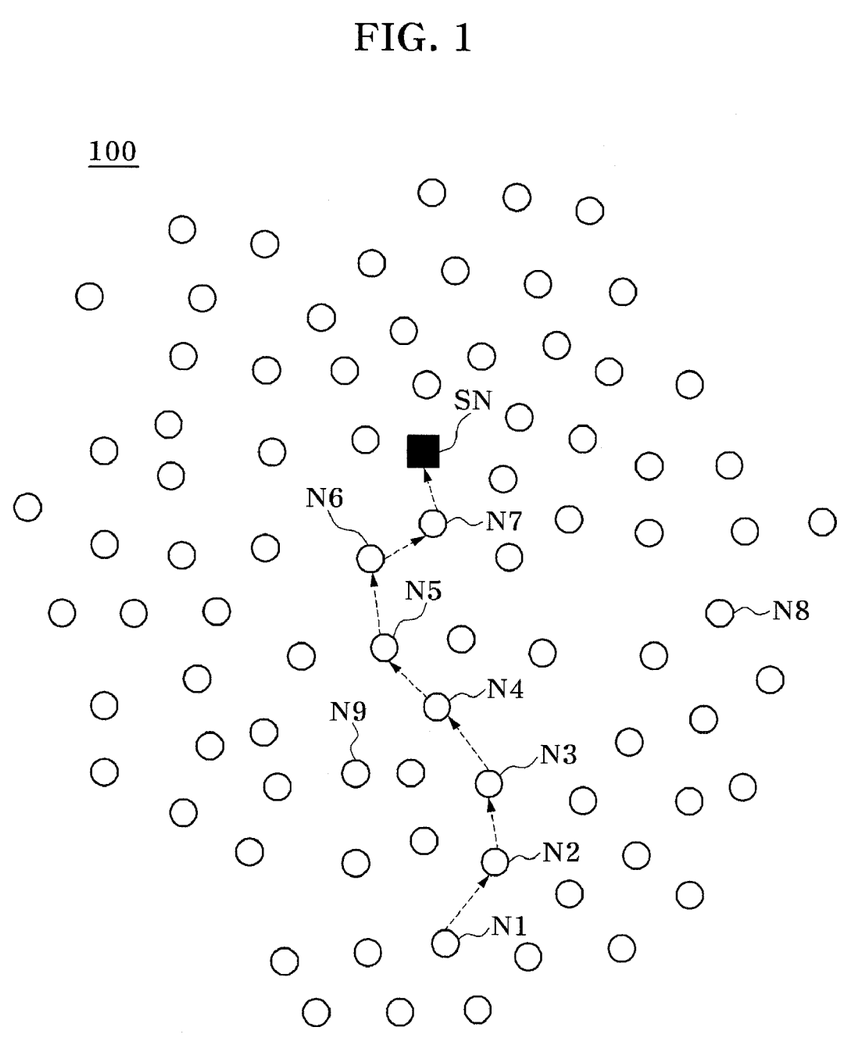
FIG. 1 illustrates a wireless sensor network.

FIG. 1 illustrates a wireless sensor network.

In FIG. 1, circles indicate sensor nodes of a wireless sensor network 100, and a square indicates a sink node of the wireless sensor network 100.

As illustrated in FIG. 1, data transmitted from a first sensor node N1 arrives at the sink node SN via a wireless relay of second to seventh sensor nodes N2 to N7. In this case, the first node N1 corresponds to a source node, and the sink node SN corresponds to a destination node.

In a future ubiquitous environment, system components must actively cope with a change of a service environment to build a network suitable for a service environment and provide services suitable for purposes. However, since in an existing wireless sensor network, a specific event is input to the sensor node so that the sensor node performs an operation for the event before the sensor node is disposed in the network, it is impossible to actively cope with events not input to the sensor node. Accordingly, it is difficult for the wireless sensor network to smoothly cope with a changing service and network environment. Also, the lifetime of the sensor node using a battery having limited power is closely related to the lifetime of the battery. For this reason, the sensor node must satisfy hardware requirements, such as very small size, low price and low power, provide stable communication between nodes in a changing network environment, and process various types of events in real time.

Among several technologies for a wireless sensor network, low-power technology is very important in view of sensor nodes operating with limited power. MAC in a wireless sensor network has been studied to minimize waste of power.

MAC protocol in the wireless sensor network may be classified into synchronous MAC protocol and asynchronous MAC protocol.

According to the synchronous MAC protocol, each node operates iteratively in an active period and a sleep period with a cycle of the active and sleep periods synchronized to neighboring nodes. In this disclosure, an active state refers to a state in which a node is allowed to perform receiving and overhearing operations and to perform a transmission operation when the node has signals to transmit (e.g., a control packet, a data packet, and an acknowledgement (ACK)). Here, the overhearing operation refers to an operation of overhearing a signal directed to another node. In this disclosure, the sleep state refers to a state in which a node does not perform reception and transmission operations for reduction of power consumption.

According to the asynchronous MAC protocol, each node wakes up in a predetermined cycle and receives a preamble packet. When data is directed to the node, the node maintains the active state to receive the data, and when the data is not directed to the node, the node immediately transitions to the sleep state.

The asynchronous MAC protocol eliminates packet exchange overhead for synchronization and exhibits a more excellent performance than the synchronous MAC protocol when there is less traffic on the network. However, when traffic increases on the network, preamble packet transmissions increase accordingly, leading to rapidly increased power consumption.

In routing-enhanced MAC (RMAC), which is a synchronous MAC protocol for a wireless sensor network which was proposed in a document, "RMAC: A Routing-Enhanced Duty-Cycle MAC Protocol for Wireless Sensor Networks," in INFOCOM 2007 pp. 1478-1486, May 2007, multi-hop data transmission is performed in one cycle using routing information of a network, thereby reducing power consumption and transmission latency in a sensor node. The content of the document is incorporated herein by reference within a range of the described technology.

Figure 2:
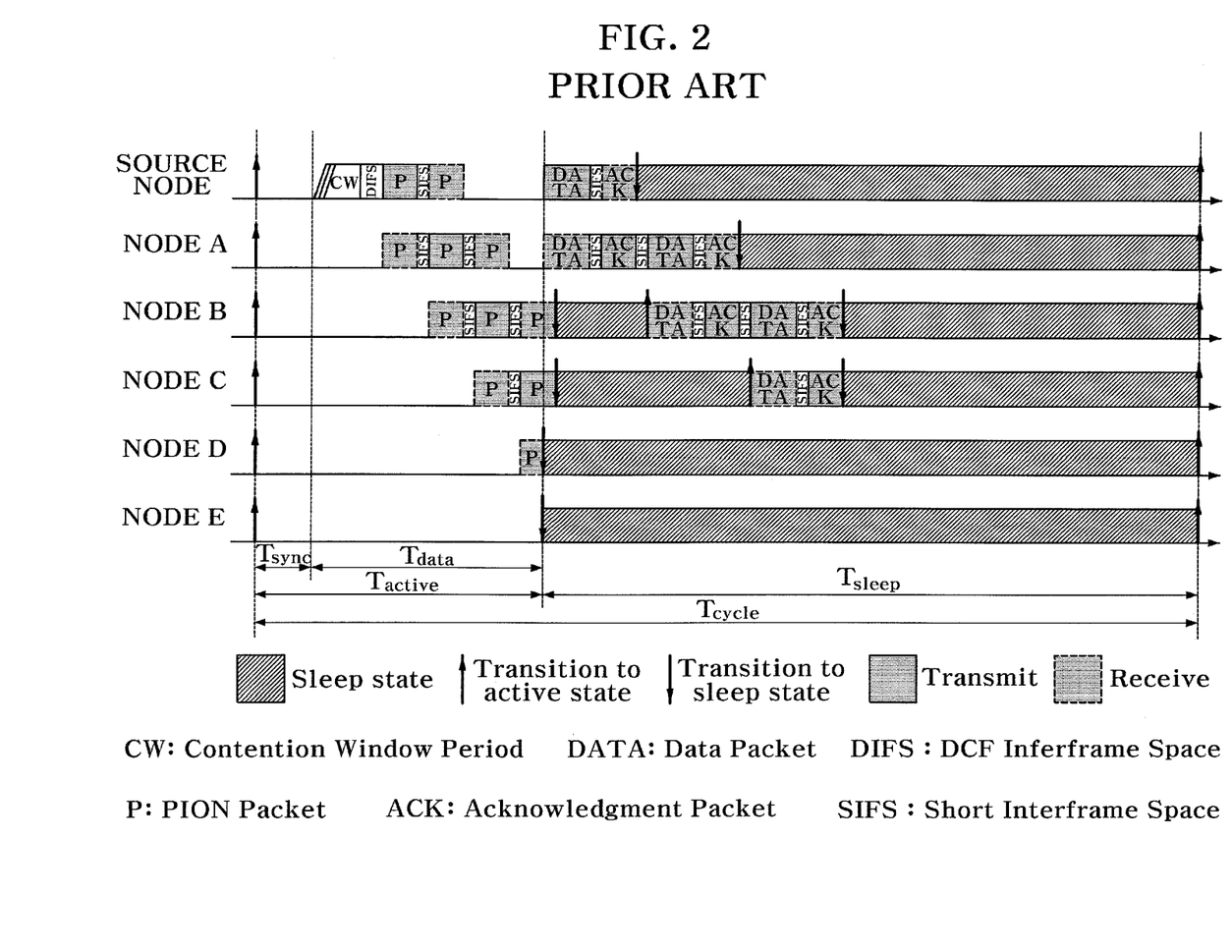
FIG. 2 illustrates an operational process of nodes according to RMAC protocol.

FIG. 2 illustrates an operational process of nodes according to RMAC protocol.

According to the RMAC protocol, one frame consists of an active period and a sleep period. Here, a length $T_{active}$ of the active period is defined as a sum of a length $T_{sync}$ of a synchronization period and a length $T_{data}$ of a data period, and one cycle $T_{cycle}$ of a frame is defined as a sum of $T_{active}$ and a length $T_{sleep}$ of the sleep period. Also, a duty cycle is defined as $T_{active}/T_{cycle} \cdot 100$.

Meanwhile, a brief description of reference numerals shown in a lower portion of FIG. 2 is the same throughout other figures.

In FIG. 2, a DCF interframe space (DIFS) may be set in advance as a waiting period until a node actually accesses a medium after a contention window expires, and a short interframe space (SIFS) may be set in advance as a time required for a node to switch both transmission and reception and process packets, i.e., a time interval between the packets.

According to the RMAC protocol, nodes exchange a control packet for synchronization to neighboring nodes in a synchronization period and exchange information required for multi-hop data transmission with the neighboring nodes using a control packet called a pioneer (PION) in a data period, to reserve the data delivery path illustrated in FIG. 1. The nodes on the data delivery path reserved during a sleep period transition to an active state at a wake-up time to transmit or relay data, and other nodes remain in a sleep state.

Examples of the information included in the PION include an address of a current node (i.e., a node for transmitting the PION), a next hop address, a time required for data transmission, a data destination address, and hop number information. Here, the hop number information is an accumulated hop number resulting from the PION passing through nodes in a data period of a current cycle, and is used to set a wake-up time in order to transmit and receive data in the sleep period. The hop number is initialized to zero and transmitted by a node that first transmits the PION in the data period, and is increased by one each time the PION passes through one hop. The nodes entering the sleep period transition to the sleep state, and among the nodes, only nodes that have successfully exchanged the PION (e.g., the source node, node A, node B, and node C in FIG. 2) are activated at a calculated time to transmit data to the destination.

The RMAC protocol has a characteristic that only nodes that have successfully exchanged the control packet in the active period nodes are activated in the sleep period to transmit data, and other nodes transition to the sleep state to decrease power consumption. However, since RMAC protocol operates in a fixed duty cycle, power consumption and transmission latency are traded off according to a ratio of $T_{active}$ and $T_{sleep}$. For example, when $T_{active}$ is fixed and the duty cycle increases, $T_{sleep}$ becomes smaller and one cycle decreases. Accordingly, the packet throughput increases and the transmission latency decreases, but the active state is frequently maintained even when there is no packet transmission, which decreases power efficiency. On the other hand, when $T_{active}$ is fixed and the duty cycle becomes smaller, $T_{sleep}$ increases and one cycle increases, which can decrease power consumption, but when a packet is generated in the sleep period, a waiting time of a packet in a buffer until an active state begins increases, leading to increased transmission latency.

Figure 3:
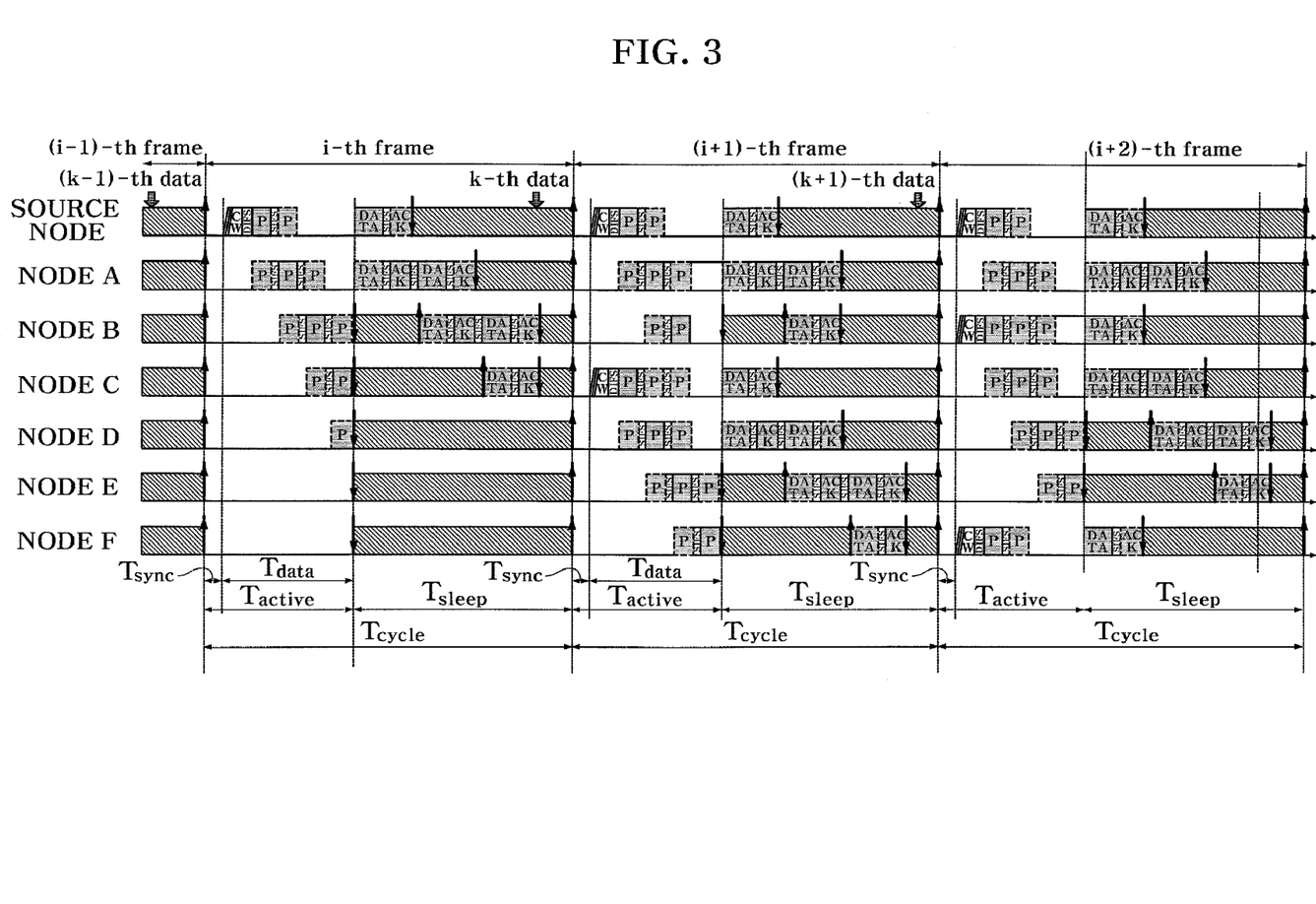
FIG. 3 illustrates an example in which, in RMAC protocol, a waiting time of a data packet in a buffer increases when at least one data packet is generated every cycle, which increases data transmission latency.

FIG. 3 illustrates an example in which, in the RMAC protocol, a waiting time of a data packet in a buffer increases when at least one data packet is generated every cycle, which increases data transmission latency.

Referring to FIG. 3, a (k−1)-th data packet generated at a source node in a (i−1)-th cycle (i.e., a frame) is delivered from the source node to node C through a relay of nodes A and B in an i-th cycle, and node C transmits a PION in a data period of the (i+1)-th cycle to deliver the data packet received in the i-th cycle. Also, the source node transmits a PION in the data period of the (i+1)-th cycle to transmit a k-th packet, and the PION arrives at node C via the relay of nodes A and B. However, because the RMAC protocol allows nodes to transmit only the one PION in the data period, node C that has already transmitted the PION to a next hop cannot transmit a response PION to the PION received from node B. As a result, node B does not receive the response PION and a data packet to be sent by node B waits in the buffer. This situation continuously occurs even in a data period of a next cycle, a (i+2)-th cycle, leading to increased data transmission latency.

In this disclosure, when the PION is delivered from a first node to a second node, a response PION from the second node means a control packet (e.g., a type of ACK) that the second node actively transmits to the first node in order to indicate that the PION has been normally received, or, a PION overheard by the first node when the second node transmits the PION to a third node.

Meanwhile, in order to resolve problems of increased data transmission latency and unnecessary power waste in existing RMAC as illustrated in FIG. 3, according to an exemplary embodiment of the present disclosure, a suitable frame structure is dynamically selected as an amount of traffic changes, such that power consumption can be minimized, high data throughput can be maintained, and data transmission can be performed with less transmission latency. According to another exemplary embodiment of the present disclosure, a multi-hop data transmission distance is extended to further decrease the power consumption and the transmission latency.

Figure 4:
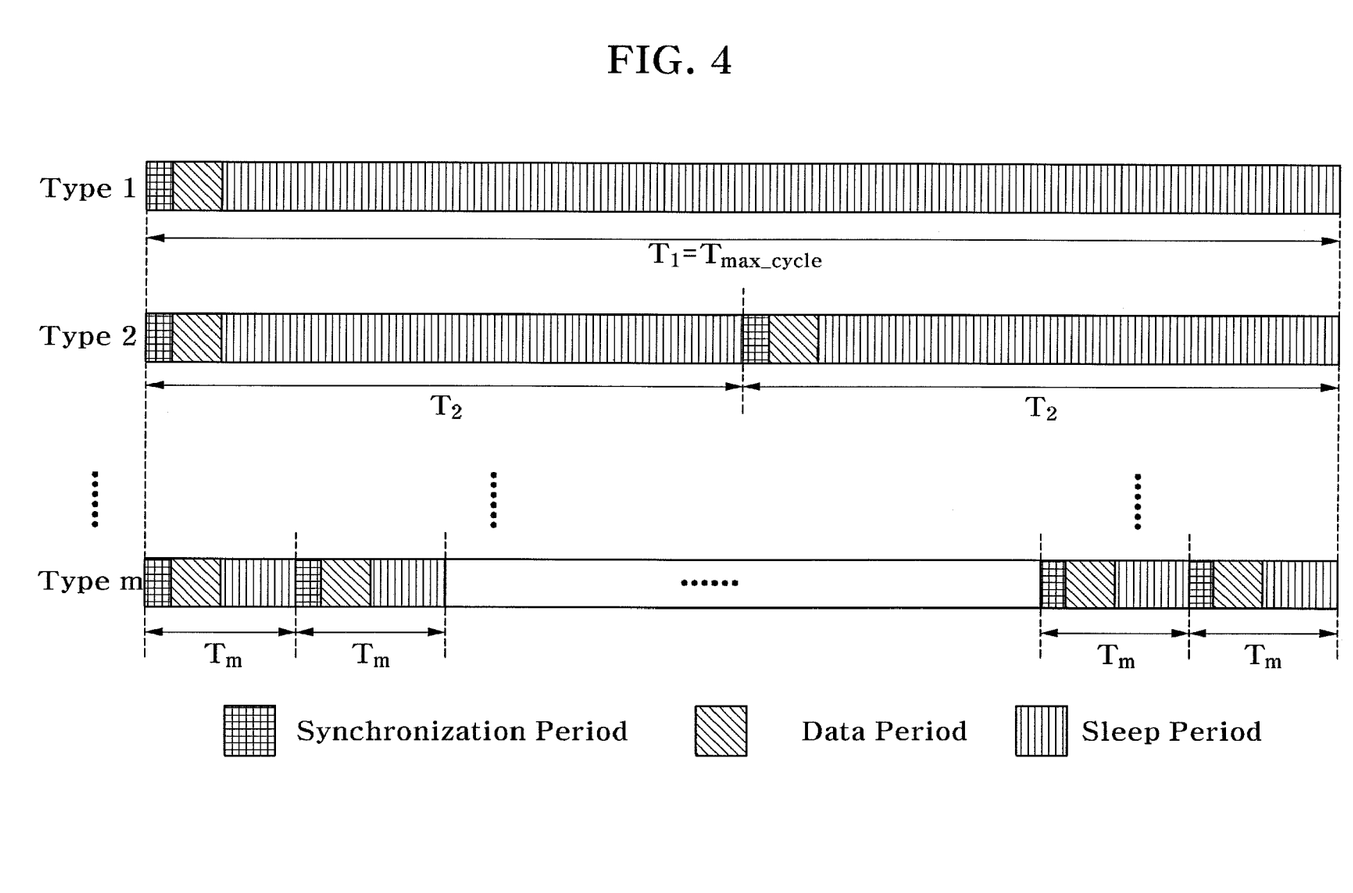
FIG. 4 illustrates frame structures according to an exemplary embodiment of the present disclosure.

FIG. 4 illustrates frame structures according to an exemplary embodiment of the present disclosure.

In an exemplary embodiment, as shown in FIG. 4, a maximum cycle $T_{max\_cycle}$ having a fixed length is defined in view of an environment that generates packets very rarely in a wireless sensor network. $T_m$ indicates a sub-cycle of a frame of type m, and $T_m = T_{max\_cycle}/2^{(m-1)}$. In this case, the frame of type m consists of $2^{(m-1)}$ sub-frames, each consisting of a synchronization period, a data period and a sleep period. In an exemplary embodiment, nodes operating in the frame of type m may be synchronized only in a synchronization period of a first sub-frame, and may maintain a sleep state in synchronization periods of other sub-frames to decrease power consumption.

In an exemplary embodiment, the source node determines a current frame structure based on a data packet generation interval $D_{int}$, includes information on the determined frame structure (i.e., frame structure information) in a PION, and transmits the resultant PION. In an exemplary embodiment, the source node measures the data packet generation interval $D_{int}$. When $D_{int} \geq 2 \cdot T_{max\_cycle}$, the source node determines a current frame structure as a frame structure of type 1, and when $T_{m-1} \leq D_{int} < 2 \cdot T_{m-1}$ (where m=2, 3, the source node determines the current frame structure as a frame structure of type m. Nodes on a path to a destination that have received the PION determine their frame structure based on the frame structure information in the PION.

In an exemplary embodiment, nodes other than the source node (i.e., the nodes on the path to the destination that have received the PION) determine a frame structure based on the frame structure information in the PION directed to the nodes, as the current frame structure. In an exemplary embodiment, when the nodes other than the source node have frame structure information in several PIONs, the nodes determine a frame structure of the highest type as the current frame structure.

Figure 5A:
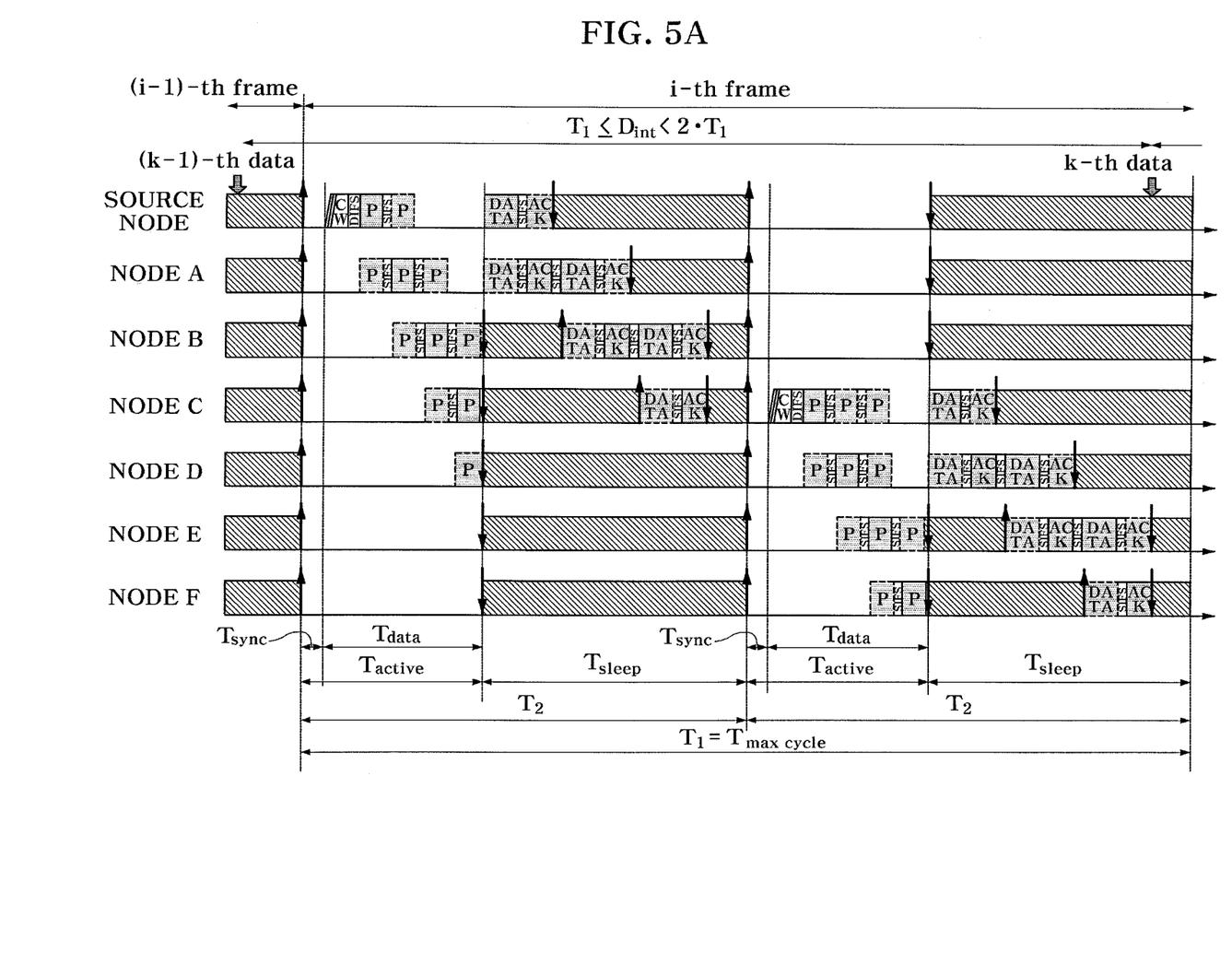
FIG. 5 illustrates an example in which data transmission latency is prevented from increasing when frame structures according to an exemplary embodiment of the present disclosure are adaptively used according to an amount of traffic.
Figure 5B:
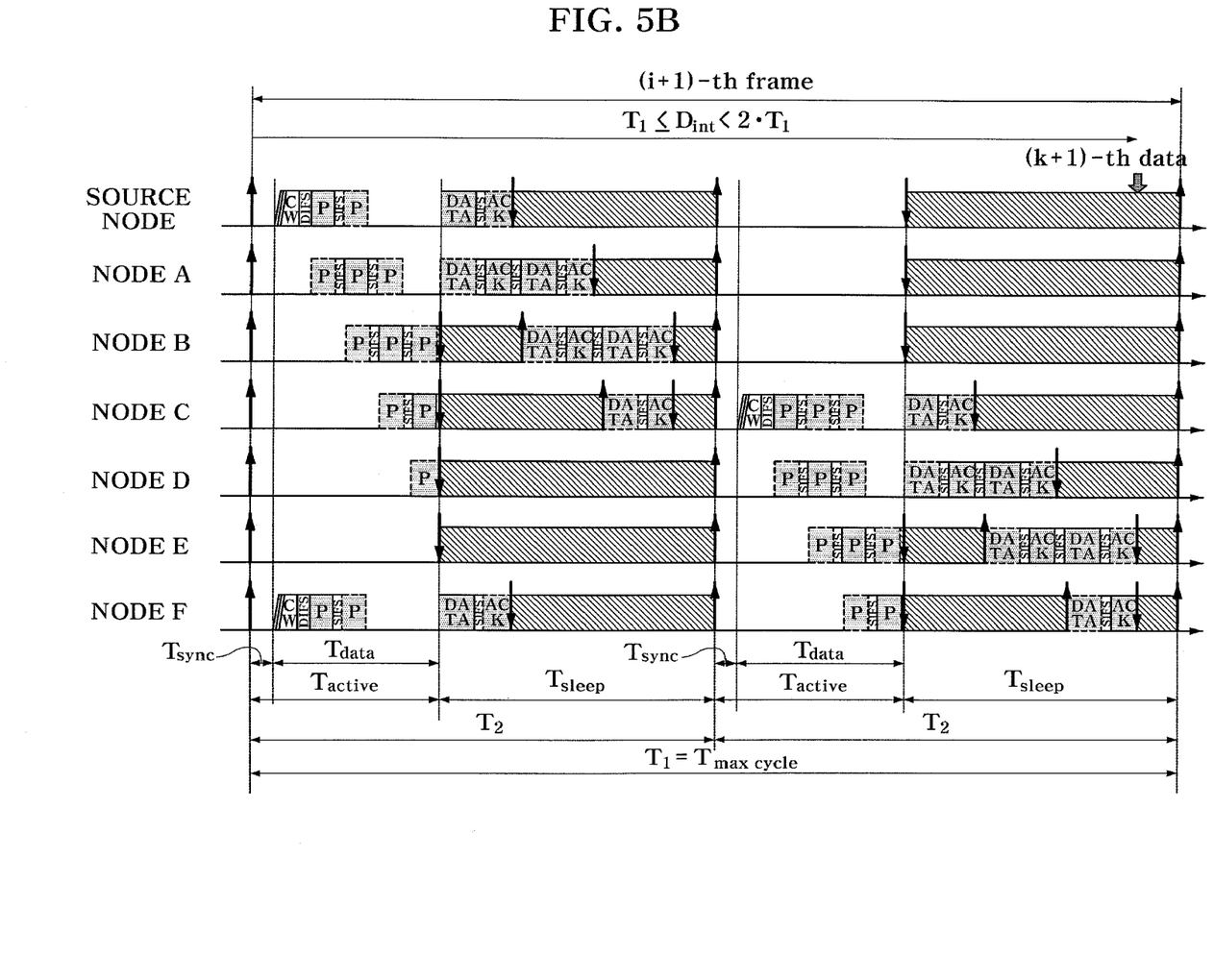

FIG. 5 (i.e., FIGS. 5A and 5B) illustrates an example in which data transmission latency is prevented from increasing when the frame structures according to an exemplary embodiment of the present disclosure are adaptively used according to an amount of traffic. A principle of preventing increase of the data transmission latency in FIG. 3, using the frame structure of Type 2 in FIG. 4, will be described with reference to FIG. 5.

Since a generation interval $D_{int}$ of a data packet be transmitted or relayed is expressed as $T_1 \leq D_{int} < 2 \cdot T_1$, all nodes shown in FIG. 5 use the frame structure of type 2 to prevent each node from receiving two or more PIONs in one active period. Thus, according to the present exemplary embodiment, the phenomenon that increases data transmission latency in FIG. 3 (i.e., the phenomenon that increases data transmission latency as the node does not transmit a response PION after receiving a second PION) can be prevented.

Figure 6:
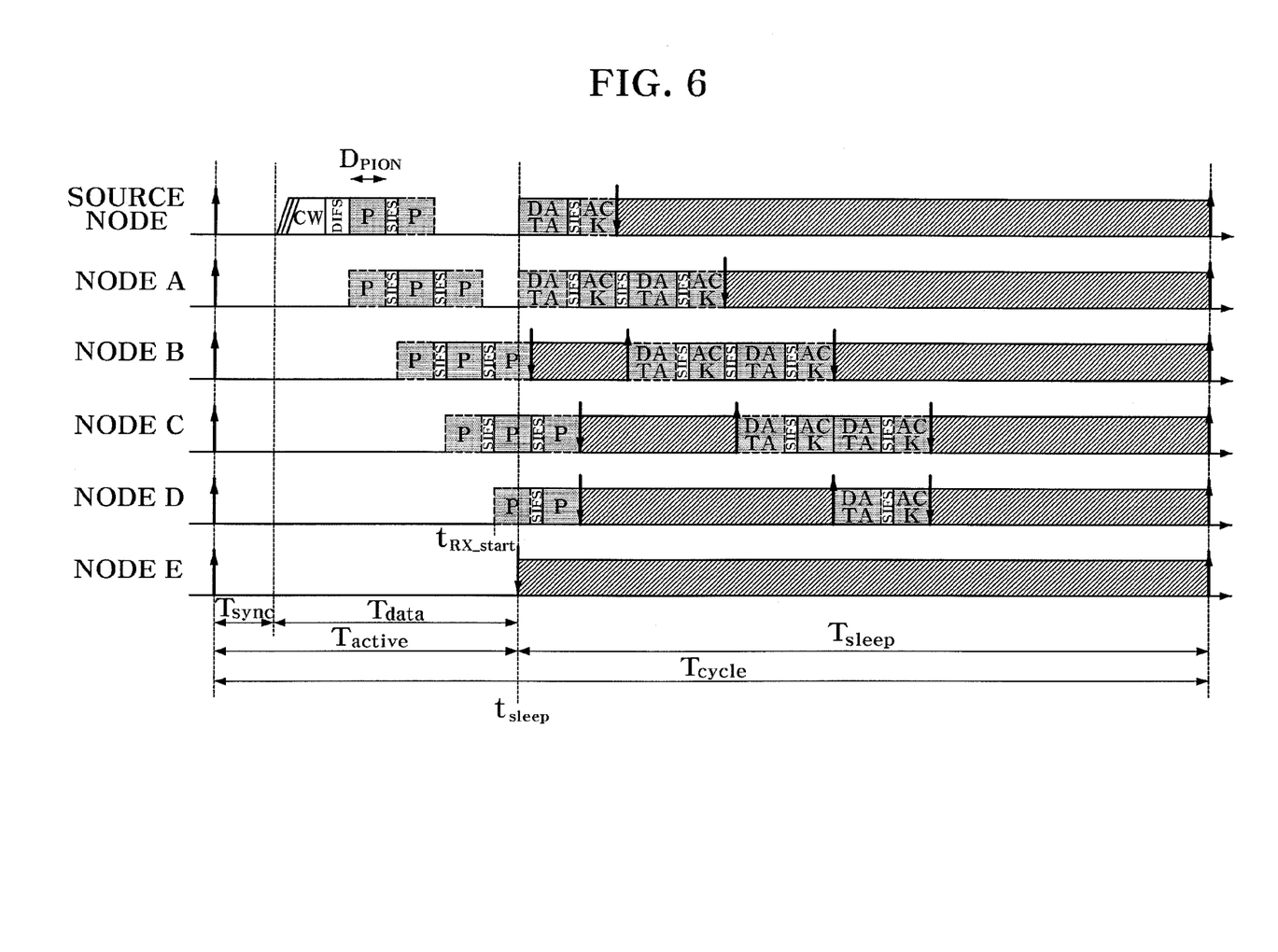
FIG. 6 illustrates operation of nodes for extending a multi-hop data transmission distance in a data period according to an exemplary embodiment of the present disclosure.

FIG. 6 illustrates operation of nodes for extending a multi-hop data transmission distance in a data period according to an exemplary embodiment of the present disclosure.

In FIG. 6, $T_{sleep}$ indicates a start point of a sleep period, $D_{PION}$ indicates a time required for PION transmission, and $t_{RXstart}$ indicates a time at which a node begins to receive the PION.

According to existing RMAC protocol, a node (e.g., node B in FIG. 2) that transmits the PION in a data period and then receives a response PION after an SIFS time maintains an additional active state until control packet reception is completed, instead of transitioning to a sleep state at $t_{sleep}$. Also, a node (e.g., node D in FIG. 2) that receives the PION without transmitting the PION transitions to the sleep state at $t_{sleep}$.

According to an exemplary embodiment of the present disclosure, a node can maintain an additional active state to extend the multi-hop transmission distance by one hop. A node, such as node C of FIG. 5, meeting a start point $t_{sleep}$ of the sleep period while transmitting a PION maintains an additional active state during a $D_{PION}$+SIFS time after completing the PION transmission, and waits for a response to the control packet. Also, a node, such as node D of FIG. 5, receiving the PION in a period [($t_{sleep}$−$D_{PION}$), $t_{sleep}$] without transmitting the PION maintains the additional active state during $D_{PION}$−($t_{sleep}$−$t_{RXstart}$), instead of transitioning to the sleep state even at $t_{sleep}$, to determine whether the PION is directed to the node itself. If a next hop address of the received PION matches the address of the node, the node maintains the additional active state during a $D_{PION}$+SIFS time to transmit the PION, and otherwise, the node transitions to the sleep mode.

Figure 7:
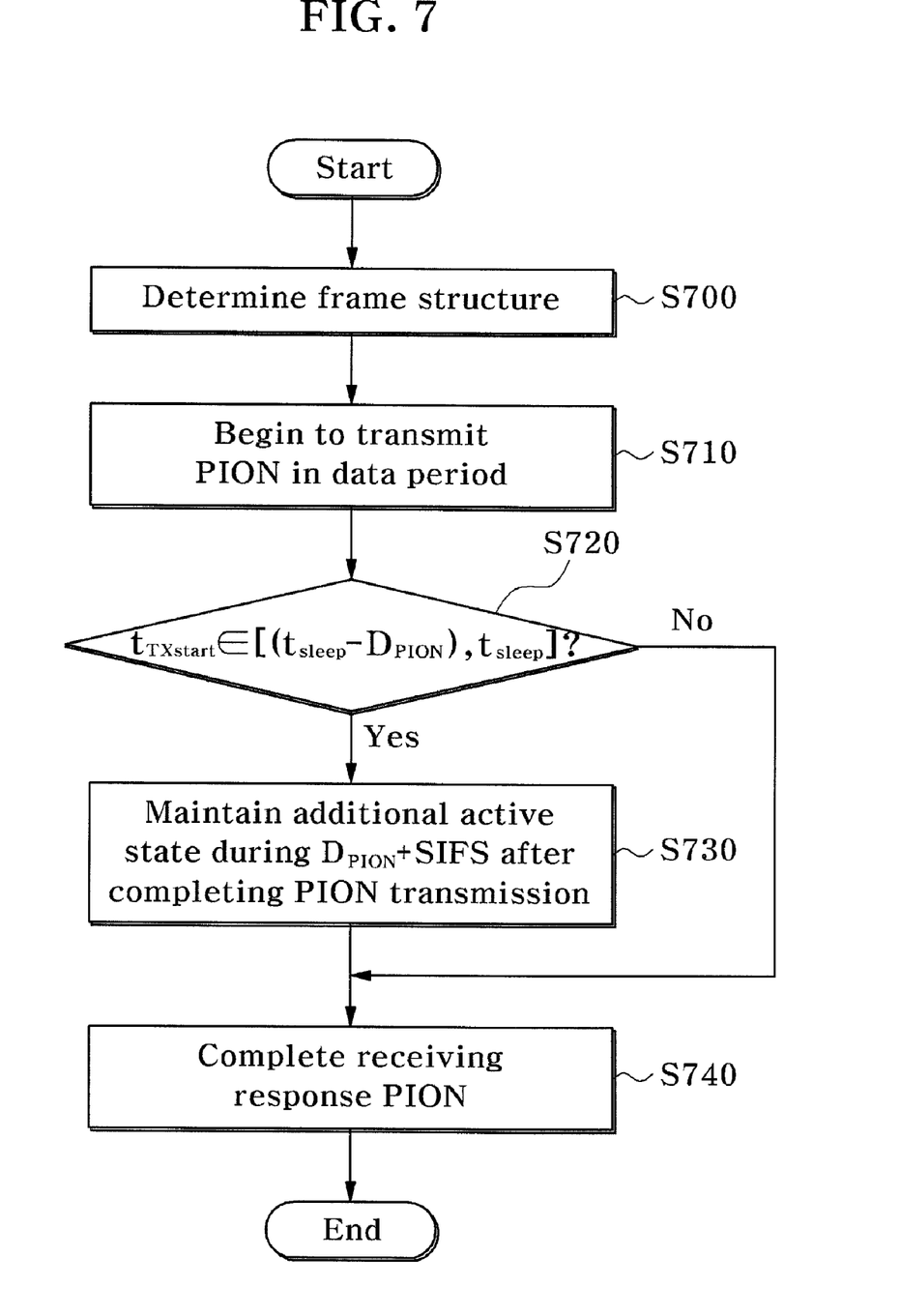
FIG. 7 is a flowchart illustrating a method by which a node having a data packet to transmit operates in a data period according to an exemplary embodiment of the present disclosure.

FIG. 7 is a flowchart illustrating a method by which a node having a data packet to transmit operates in a data period according to an exemplary embodiment of the present disclosure.

Referring to FIG. 7, a node determines a current frame structure (S700). For example, when the node having a data packet to transmit is a source node on the wireless multi-hop network that has generated the data packet, the node selects one of frame structures of type 1 to type M based on a data packet generation interval $D_{int}$, as illustrated in FIG. 4, to determine the selected frame structure as the current frame structure. In another example, when the node having a data packet to transmit is a node that has received, from a previous hop node, the data packet generated by the source node on the wireless multi-hop network, the node determines a frame structure determined according to the frame structure information included in the control packet received from the previous hop node, as the current frame structure.

The node includes information on the frame structure determined in S700 in the PION and begins to transmit the resultant PION to the next hop (S710).

The node determines whether a point in time $t_{TXstart}$ at which the node begins to transmit the PION is between $t_{sleep}$−$D_{PION}$ and $t_{sleep}$ (S720).

When $t_{TXstart}$ is earlier than $t_{sleep}$−$D_{PION}$, i.e., when the node does not enter the sleep period while transmitting the PION (S720), the node completes receiving the response PION (S740) and then terminates a communication operation in the data period (i.e., the PION delivery process).

When $t_{TXstart}$ is between $t_{sleep}$−$D_{PION}$ and $t_{sleep}$, i.e., when the node enters the sleep period while transmitting the PION (S720), the node maintains an additional active state during $D_{PION}$+SIFS after completing control packet transmission (S730), receives the response PION (S740), and terminates the communication operation in the data period.

Figure 8:
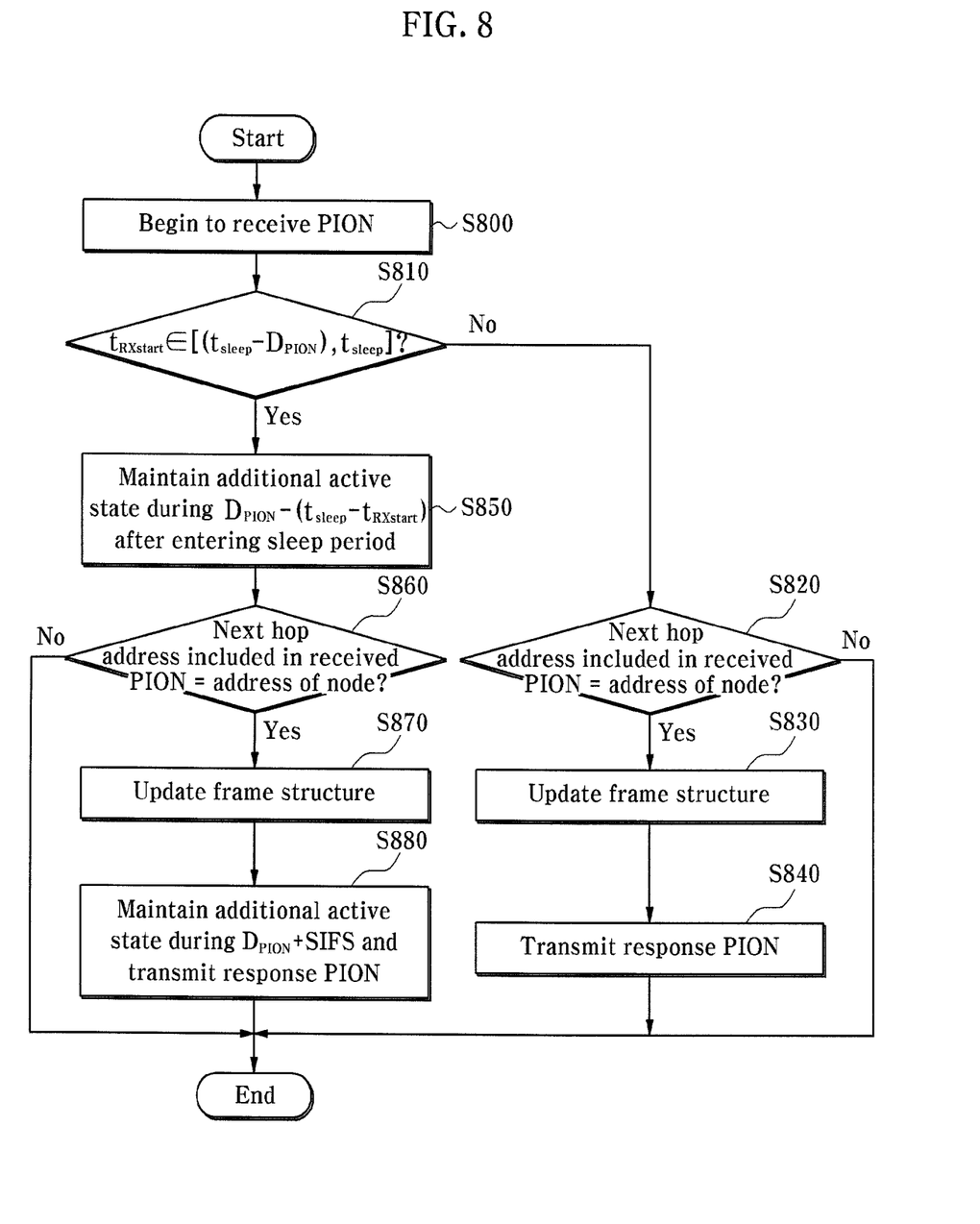
FIG. 8 is a flowchart illustrating a method by which a node operates when the node receives a PION in a data period according to an exemplary embodiment of the present disclosure.

FIG. 8 is a flowchart illustrating a method by which a node operates when the node receives a PION in a data period according to an exemplary embodiment of the present disclosure.

Referring to FIG. 8, a node in an active state begins to receive a PION from any one of neighboring nodes in a data period of a current frame structure (S800).

The node determines whether a time $t_{RXstart}$ at which the node begins to receive the PION is between $t_{sleep}$−$D_{PION}$ and $t_{sleep}$ (S810).

When $t_{RXstart}$ is earlier than $t_{sleep}$−$D_{PION}$, i.e., when the node does not enter the sleep period while receiving the PION (S810), the node determines whether a next hop address included in the received PION matches an address of the node (S820). When the next hop address included in the received PION does not match the address of the node (S820), the node discards the received PION and waits to receive another PION during a remaining data period (not shown). When the next hop address included in the received PION matches the address of the node (S820), the node updates the current frame structure with a frame structure according to the frame structure information included in the received PION (S830), and transmits a response PION (S840).

When $t_{RXstart}$ is between $t_{sleep}$−$D_{PION}$ and $t_{sleep}$, i.e., when the node enters the sleep period while receiving the PION (S810), the node maintains an additional active state during $D_{PION}$−($t_{sleep}$−$t_{RXstart}$) after entering the sleep period (i.e., after $t_{sleep}$), completes receiving the PION (S850), and determines whether the next hop address included in the received PION matches the address of the node (S860).

When the next hop address included in the received PION does not match the address of the node (S860), the node discards the received PION and waits to receive another PION during a remaining data period (not shown). When the next hop address included in the received PION matches the address of the node (S860), the node updates the current frame structure with a frame structure according to the frame structure information included in the received PION (S870), maintains an additional active state during $D_{PION}$+SIFS, and transmits a response PION (S880).

The present disclosure can be implemented as computer-readable code in a computer-readable recording medium. The computer-readable recording medium is any recording medium for storing data that can be read by a computer system. Examples of the computer-readable recording medium include a read-only memory (ROM), a random access memory (RAM), a compact disk-read only memory (CD-ROM), a magnetic tape, a floppy disk, and optical data storage. Alternatively, the medium may be implemented in the form of carrier waves (e.g., Internet transmission). The computer-readable recording medium may be distributed among networked computer systems, and the computer-readable code may be stored and executed in a decentralized manner. And, functional programs, codes and code segments for implementing the present disclosure may be easily inferred by programmers skilled in the art.

The exemplary embodiments of the present disclosure have the following advantages. However, since this does not mean that all the exemplary embodiments of the present disclosure include the advantages, the scope of the present disclosure is not limited to the advantages.

First, power consumption can be decreased. In the present disclosure, when less traffic is generated, a frame structure having a small duty cycle is selected to reduce an unnecessary wake-up period of the node and decrease the power consumption. Also, overhead of the control packet for transmitting data is reduced by extending the multi-hop data transmission distance, leading to decreased power consumption.

Second, the transmission latency is small. When traffic increases, a node can decrease the transmission latency by selecting a frame structure with a great duty cycle. It is possible to further decrease the transmission latency in one cycle by extending the multi-hop transmission distance.

Third, high data packet throughput is achieved. Since the sensor node operates in a changed frame structure so that the transmission latency does not rapidly increase with an amount of traffic, the high data packet throughput can be achieved.

With the above effects, the present disclosure can increase a lifetime of a wireless sensor network that must perform communication with limited resources, and can improve the performance of the wireless sensor network.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A method by which a source node operates in a wireless multi-hop network, the method comprising:
    selecting one among first to M-th frame structures, wherein M is a natural number greater than or equal to 2, based on a data packet generation interval;
    when the source node is in an active state, synchronizing with neighboring nodes in a first synchronization period of the selected frame structure; and
    when the source node is in the active state, transmitting a control packet to a next hop in a data period of the selected frame structure, and waiting for a response from the next hop, the control packet indicating that the source node will transmit a data packet in a sleep period subsequent to the data period and including information on the selected frame structure,
    wherein each of the first to M-th frame structures defines a frame including at least one synchronization period, at least one data period, and at least one sleep period, and each of the first to M-th frame structures having a different duty cycle.

2. The method according to claim 1, wherein each of the first to M-th frame structures defines a frame including a different number of sub-frames sequentially including a synchronization period, a data period, and a sleep period, and having a previously set time length T1, wherein the synchronization period and the data period of each sub-frame have a fixed time length irrespective of the frame structure.

3. The method according to claim 2, wherein the frame defined according to the m-th frame structure, wherein m is a natural number ranging from 1 to M, includes $2^{m-1}$ sub-frames having a time length of $T_m = T1/_{2m-1}$.

4. The method according to claim 3, wherein selecting one among first to M-th frame structures comprises:
    if the data packet generation interval $D_{int}$ is greater than or equal to $2 \cdot T1$, selecting the first frame structure, and otherwise, selecting the m-th frame structure satisfying $T_{m-1} \leq D_{int} < 2 \cdot T_{m-1}$ (where m is a natural number greater than or equal to 2 and less than or equal to M).

5. The method according to claim 1, wherein the wireless multi-hop network comprises a wireless sensor network.

6. A method by which a node having a data packet to transmit operates in a wireless multi-hop network, the method comprising:
    determining a current frame structure; and
    when the node is in an active state, transmitting a control packet to a next hop in a data period of the determined frame structure, and receiving a response from the next hop, the control packet indicating that the node will transmit the data packet in a sleep period subsequent to the data period and including information on the determined frame structure,
    wherein the determined frame structure is one among first to M-th frame structures, wherein M is a natural number greater than or equal to 2, and
    each of the first to M-th frame structures defines a frame including at least one synchronization period for synchronizing with neighboring nodes, at least one data period, and at least one sleep period, and each of the first to M-th frame structures having a different duty cycle.

7. The method according to claim 6, wherein the node having a data packet to transmit is a source node on the wireless multi-hop network that has generated the data packet, and
    determining the current frame structure comprises selecting one of the first to M-th frame structures, based on a data packet generation interval.

8. The method according to claim 6, wherein the node having a data packet to transmit is a node that has received, from a previous hop node, the data packet generated by a source node on the wireless multi-hop network, and
    determining the current frame structure comprises determining a frame structure based on frame structure information in a control packet received from the previous hop node, as the current frame structure.

9. The method according to claim 8, further comprising:
when $t_{TXstart}$ is earlier than $t_{sleep-DPION}$, transitioning to a sleep state at tsleep and maintaining the sleep state until a wake-up time, the wake-up time being a time at which the node transitions to the active state to transmit the data packet to the next hop and being present in the sleep period subsequent to the data period,
wherein $t_{TXstart}$ is a time at which the node begins to transmit the control packet in transmitting the control packet,
$t_{sleep}$ is a time at which the data period expires in transmitting the control packet, and
$D_{PION}$ is a duration of the control packet.

10. The method according to claim 8, wherein transmitting the control packet comprises: when $t_{TXstart}$ is between $t_{sleep-DPION}$ and $t_{sleep}$, completing transmitting the control packet and then maintaining the active state during an additional time $D_{PION}$+SIFS to receive the response from the next hop, and
the method further comprises:
when the additional time lapses, transitioning to a sleep state and maintaining the sleep state until a wake-up time, the wake-up time being a time at which the node transitions to the active state to transmit the data packet to the next hop and being present in the sleep period subsequent to the data period,
wherein $t_{TXstart}$ is a time at which the node begins to transmit the control packet in transmitting the control packet,
$t_{sleep}$ is a time at which the sleep period subsequent to the data period to which $t_{TXstart}$ belongs begins,
$D_{PION}$ is a duration of the control packet, and
SIFS is a previously set time interval between packets.

11. A method by which a node operates in a wireless multi-hop network, the method comprising:
when the node is in an active state, synchronizing with neighboring nodes in a synchronization period of a current frame structure, the current frame structure being any one of first to M-th frame structures, wherein M is a natural number greater than or equal to 2;
when the node is in the active state, receiving a control packet from any one of the neighboring nodes in a data period of the current frame structure, the control packet indicating that the node will transmit a data packet in a sleep period subsequent to the data period and including frame structure information;
when a next hop address included in the received control packet is an address of the node itself, updating the current frame structure with a frame structure according to the frame structure information; and
operating according to the updated frame structure,
wherein each of the first to M-th frame structures defines a frame including at least one synchronization period for synchronizing with the neighboring nodes, at least one data period, and at least one sleep period, and each of the first to M-th frame structures having a different duty cycle.

12. The method according to claim 11, wherein operating according to the updated frame structure comprises transmitting the received control packet to a next hop node.

13. The method according to claim 11, wherein operating according to the updated frame structure comprises transmitting a response to the received control packet.

14. The method of claim 13, wherein receiving the control packet comprises: when $t_{RXstart}$ is between $t_{sleep-DPION}$ and $t_{sleep}$, maintaining the active state during $D_{PION}-(t_{sleep}-t_{RXstart})$ from $t_{sleep}$ to complete receiving the control packet,
operating according to the updated frame structure comprises maintaining the active state during an additional time $D_{PION}$+SIFS from a time at which the node completes receiving the control packet, and transmitting the response to the received control packet,
$t_{RXstart}$ is a time at which the node begins to receive the control packet,
$t_{sleep}$ is a time at which the sleep period subsequent to the data period including $t_{RXstart}$ begins,
$D_{PION}$ is a duration of the control packet, and
SIFS is a previously set time interval between packets.

15. The method according to claim 11, wherein each of the first to M-th frame structures defines a frame including a different number of sub-frames sequentially including a synchronization period, a data period, and a sleep period, and having a previously set time length T1, and the synchronization period and the data period of each sub-frame have a fixed time length irrespective of the frame structure.

16. The method according to claim 11, wherein in synchronizing with the neighboring nodes, the node is in the sleep state in synchronization periods other than a first synchronization period of the current frame structure.

17. The method according to claim 11, wherein the frame structure according to the frame structure information is selected from the first to M-th frame structures by a source node for the data packet, based on a data packet generation interval.

18. The method according to claim 11, wherein updating the current frame structure comprises: when two or more control packets are received during a frame of the current frame structure, setting a frame structure having the highest duty cycle among frame structures according to information included in the two or more control packets, as the current frame structure.

* * * * *